Dec. 4, 1928. 1,693,862
A. OTTO
SLED ATTACHMENT FOR MOTOR VEHICLES
Filed Oct. 7, 1927
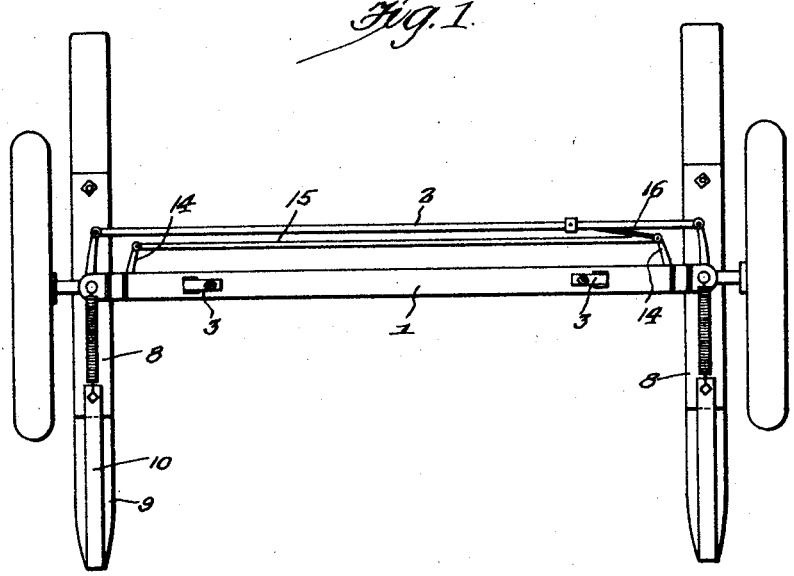
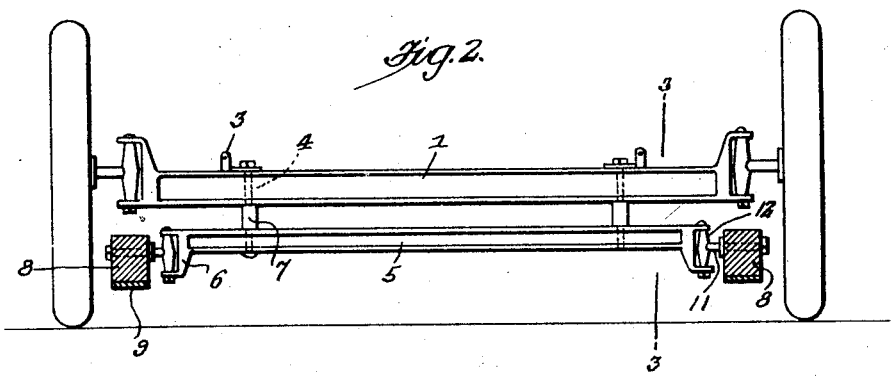
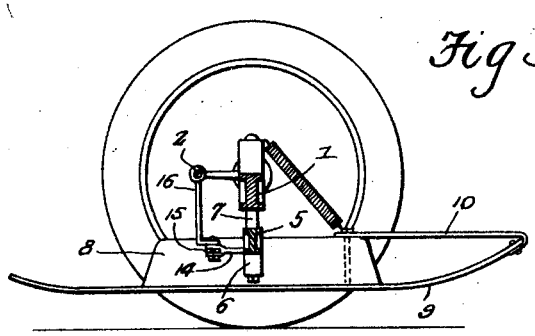
Inventor
August Otto,
By Clarence A. O'Brien
Attorney Patented Dec. 4, 1928.

1,693,862

UNITED STATES PATENT OFFICE.

AUGUST OTTO, OF SAUK CENTER, MINNESOTA.

SLED ATTACHMENT FOR MOTOR VEHICLES.

Application filed October 7, 1927. Serial No. 224,655.

My invention relates to a sled attachment for motor vehicles and the same relates more particularly to means associated with the axles of a vehicle whereby the wheels of said vehicle may be properly steered and also prevented from sinking in deep snow.

In regions where snow falls and settles frequently in deep drifts on roadways, it has been the experience of motorists that the wheels of their car cannot be steered and damage has very frequently resulted. The purpose of my invention is to prevent the wheels from sinking in deep snow by providing the axle portion of the car with runners that may be steered in a like manner to the steering of the vehicle wheels. In this arrangement, no additional steering devices are necessary, excepting for a connection between the connection rod of the vehicle steering mechanism and my novel sled attachment.

An object therefore is to provide such a runner attachment for vehicles which can be steered simultaneously with the steering of the vehicle wheels.

Another object resides in the novel construction of the sled attachment whereby it may be conveniently associated with the axle of a conventional motor vehicle.

Still another object resides in the effective manner in which the attachment will function, and in its durable construction.

Other very important objects and advantages will become more apparent as my invention is better understood from the specification and claims to follow.

In the drawings:—

Figure 1 is a top plan view of my attachment showing the same in operative position in respect to the conventional steering mechanism and axle construction of a motor vehicle.

Figure 2 is a front elevation of the device as is represented in Figure 1, showing the runners in cross section, and, Figure 3 is a cross sectional view of my attachment shown in association with the conventional axle portion and taken substantially on the line 3—3 of Figure 1.

For a more detailed explanation of my invention, I now refer to the drawings in which like numerals designate like parts.

My attachment is adapted to associate with the usual axle 1 and connecting rod 2 of a conventional motor vehicle. The axle 1 is provided with the usual shackle members 3 to which the ends of the usual leaf spring are connected. Ordinarily, these shackle members are connected to the axle by a bolt extending through the axle and threaded to receive a nut or the like. However, in associating my attachment with the usual axle, this bolt member is of substantially longer construction than the conventional bolt for a purpose hereinafter more fully described.

Specifically, my attachment comprises a cross bar 5 provided at each end portion with a U-shaped yoke member 6. This cross bar is preferably constructed of I-shaped material and is formed with openings adjacent the yoke portion and through which the bolt members 4 extend. An elongated collar 7 disposed on each of said bolt members is adapted to space the cross bar 5 from the conventional axle 1.

The runner members associated with my attachment comprise an elongated block 8 to the bottom of which is secured the runner plate 9. The front and rear end portions of the runner are bent upwardly, and a tie member 10 connected at one end to the elongated block has its opposite end portion secured to the forward extremity of the runner plate. The elongated block 8 is formed with a transverse opening therethrough and through which is adapted to extend a stub axle 11. The inner end of this stub axle is provided with a knuckle member 12. This knuckle member is disposed in right angular relation to the stub axle 11 and is adapted in position between the legs of the yoke 6 at the end portions of the cross bar 5. The knuckle is formed with a longitudinal bore therethrough and through which a bolt member extends for hingedly securing the same to the yoke portion.

Each of these knuckles 12 is provided with rearwardly extending arm members 14, which are connected together at their free ends by a connecting bar 15. Pivotally secured to the connecting bar 15 in a suitable manner is a bar 16 which has its opposite end connected to the connecting rod 2 of the conventional steering mechanism. A coiled spring 17 has one end thereof connected to the conventional axle in any manner found suitable, while the opposite end of the spring is secured to the elongated block 8 at the forward end portion thereof. The purpose of this spring is to resiliently support the forward portion of the runner.

It will be seen that when the conventional steering mechanism of a motor vehicle to which my attachment is associated, is actuated the conventional connecting rod 2 will shift the rod 16 connecting the same to my sled attachment. The knuckles 12 having their rearwardly extending arm members 14 pivotally connected together by the connecting rod 15 will be caused to swing when movement is engendered therethrough by the rod connection 16. This simultaneous movement of the parts of my attachment with the parts of the conventional steering mechanism causes the movement of the runners in unison with the movement of the vehicle wheels. It will be seen that the runners not only assist in supporting the vehicle from sinking in deep snow, but the same is equally advantageous in assisting the vehicle to be steered in the direction desired.

Having thus described my invention, what I claim as new is:—

1. In a sled attachment for motor vehicles in association with the conventional steering mechanism and axle parts, a cross bar adapted to be connected to the usual axle, runner members, said runners being provided with a transverse pin projecting from said runners, construction on said pin adapted to be associated with complementary construction on the cross bar whereby the runners may be pivotally associated to the cross bar, and means associated with said pin in connection with the conventional steering mechanism for simultaneously steering said runners in unison with the vehicle wheels.

2. In a sled attachment for motor vehicles in association with the conventional steering mechanism and axle parts, a cross bar adapted to be connected to the usual axle, yoke members provided at each end portion of said cross bars, runner members, each of said runner members being provided with a transverse pin projecting from said runner, a T-shaped head on said pin and having a bore therethrough, said T-shaped head adapted to be disposed between the leg portions of the yoke member, a bolt adapted to extend through said leg members and the bore of the head, an arm member extending rearwardly from each T-shaped head, a connecting rod pivotally associated with said arms, and connecting means between the connecting rod and the conventional steering mechanism.

In testimony whereof I affix my signature.

AUGUST OTTO.